United States Patent [19]

Severinghaus, Jr. et al.

[11] Patent Number: 4,824,653

[45] Date of Patent: Apr. 25, 1989

[54] METHOD OF BLEACHING LIMESTONE

[75] Inventors: Nelson Severinghaus, Jr., Nashville, Tenn.; Gregory R. Sharp, Anchorage, Ak.

[73] Assignee: Franklin Industries, Inc., Nashville, Tenn.

[21] Appl. No.: 250,551

[22] Filed: Sep. 29, 1988

[51] Int. Cl.⁴ .................. C01F 5/24; C01F 11/18; C01F 11/06; C09C 1/02

[52] U.S. Cl. .................. 423/430; 106/464; 423/173

[58] Field of Search ............... 423/430, 432, 173; 106/464

[56] References Cited

U.S. PATENT DOCUMENTS

| | | | |
|---|---|---|---|
| 4,018,877 | 4/1977 | Woode | 423/432 |
| 4,157,397 | 6/1979 | Arika et al. | 423/430 |
| 4,239,736 | 12/1980 | Fenske | 423/430 |
| 4,661,164 | 4/1987 | Severinghaus, Jr. | 106/465 |

FOREIGN PATENT DOCUMENTS

| | | | |
|---|---|---|---|
| 46-14821 | 4/1971 | Japan | 423/430 |
| 51-47597 | 4/1976 | Japan | 423/430 |
| 58-26031 | 2/1983 | Japan | 423/430 |
| 58-40133 | 3/1983 | Japan | 423/430 |
| 180572 | 5/1966 | U.S.S.R. | 423/430 |
| 1069276 | 5/1967 | United Kingdom | 423/430 |
| 1285891 | 8/1972 | United Kingdom | 423/430 |

*Primary Examiner*—Gary P. Straub
*Attorney, Agent, or Firm*—Harrington A. Lackey

[57] ABSTRACT

A method for improving the brightness of limestone utilizing a chelating agent and a bleaching agent in a limestone slurry in which the pH of the slurry is normally between 9.0 and 9.6.

19 Claims, No Drawings

METHOD OF BLEACHING LIMESTONE

BACKGROUND OF THE INVENTION

This invention relates to a method of bleaching limestone, and more particularly to a method for removing small amounts of iron, usually in the form of iron oxide, from the limestone in order to improve the whiteness of the limestone.

Most limestone deposits contain small amounts of iron oxides or other forms of iron. The iron imparts a yellow, reddish, or pink tint to the limestone rendering the limestone, even when ground, totally unacceptable for many uses, and therefore of little commercial value. The most lucrative filler and pigment applications require a bright white ground limestone product with little or no hue or tint. Very few limestone deposits are naturally white enough for the most lucrative markets.

In order to produce a white limestone product, most limestone ore requires some form of color beneficiation. If the iron oxide is in a form that is discrete from the limestone, the iron oxide can first be treated by grinding the ore fine enough to liberate the iron oxide. Then the free iron oxide may be removed physically by several known processes, such as screening or classification, magnetic separation, or flotation. The iron oxide may also be removed from the ground limestone by chemically bleaching or leaching with solvents for iron oxides followed by filtering. Dithionite-type bleaching agents perform most efficiently under acidic conditions of 2 to 5 pH, which cannot be obtained due to buffering by the calcium carbonate in the limestone as it reacts with the acid.

One method for chemically removing iron from limestone is taught in the U.S. Pat. No. 4,239,736, to Fenske now owned by Franklin Industries, Inc., the common assignee of this application. The patented Fenske process includes the mixing of ground limestone with water to form a slurry to which is added a flocculating agent, such as acetic acid, and a bleaching agent, such as sodium hydrosulfite. This process is carried out at a temperature preferably between 70–120 deg. F. for a sufficient length of time to allow the iron oxide to undergo a chemical reaction with the bleaching agent, the resultant iron product passing into solution with the water. The slurry is then filtered to physically remove the dissolved iron from the limestone, leaving the limestone with an improved whiteness.

However, it has been found that the Fenske process is primarily successful on grades of limestone that are nearly white enough naturally to be sold as white products without chemical treatment to beneficiate the color. It has been found that only small amounts of iron are removed by the Fenske process, while the poorer grades of limestone with more iron oxide contaminants still retain an undesirable tint.

As noted in the prior Fenske U.S. Pat. No. 4,239,736, bleaching agents other than sodium hydrosulfite, such as zinc hydrosulfite, K-Brite - 3E, and K-Brite - 3K of the Virginia Chemical Company, as well as sulfur dioxide and zinc dust can also be used in the chemical reaction with iron, and particularly iron oxide.

Another method of increasing the whiteness of limestone by optically transforming the natural tint of the limestone by introducing a pigment of a different color is disclosed in the common assignee's U.S. Pat. No. 4,661,164, issued Apr. 28, 1987.

SUMMARY OF THE INVENTION

It is therefore an object of this invention to provide a method of bleaching limestone in which the whiteness of even poorer grades of limestone, containing iron contaminants, is improved to provide a more valuable, premium grade limestone product which will have more commercial uses than poorer grades of limestone.

Another object of this invention is to provide a method of bleaching limestone in order to remove the iron contaminants without the necessity of reducing the pH of the limestone.

A further object of this invention is to provide an improved method of bleaching limestone by effectively utilizing bleaching agents, without the use of acids.

A further object of this invention is to provide an improved method of bleaching limestone at the natural pH of 9.0–9.6 of a water limestone slurry.

A further object of this invention is to provide an improved method of bleaching limestone by the addition of a chelating agent with the bleaching agent in a water slurry of ground limestone.

A further object of this invention is to provide a method of bleaching limestone which may be carried out at elevated temperatures and in a minimum of time, without reducing the pH of the limestone mixture.

DESCRIPTION OF THE PREFERRED EMBODIMENTS

Generally speaking the method of bleaching limestone in accordance with this invention is carried out by first grinding the tinted limestone having small amounts of iron or iron oxides into small sizes by conventional methods of either wet or dry grinding. The ground limestone is then mixed with water to form a slurry having a solids content of approximately 15%–50%. To the slurry is added an amount of chelating agent, such as one of the salts of EDTA (ethylenediamenetetraacetic acid) capable of sequestering or complexing the iron ions from the slurry, and an amount of a bleaching agent, such as sodium hydrosulfite, in an amount sufficient to react with any iron present in the slurry. The slurry including the chemicals is then mixed for a brief period of time at an elevated temperature such as approximately 150 deg. F. The resultant slurry is then filtered to remove the soluble iron from the limestone, after which the limestone filter cake is then dried to produce a limestone product with substantially enhanced whiteness.

By utilizing a chelating agent with the bleaching agent, instead of an acid or flocculating agent, the bleaching process can be carried out without reducing the natural pH of the limestone mixture. Moreover, a whiteness is obtained in the resultant dried limestone product which is superior to any previously known mechanical or chemical processes for removing iron contaminants from limestone.

Specific examples of the bleaching method are as follows:

EXAMPLE I

A sample of Central Texas limestone stained yellow with iron oxides was wet ground in a jar mill to a particle size 85% smaller than 44 microns. The sample was split into two smaller samples for comparison tests between the prior Fenske process and the process carried out in accordance with this invention.

In the first test, the first sample of ground limestone was slurried with water until the slurry had 50% solids by weight. To the first slurry was added 3 pounds per ton of acetic acid and 7 pounds per ton of hydrosulfite. The pH of the slurry was 7.2. The slurry and chemicals were mixed gently for 25 min., at a temperature of 150 deg. F. After the 25 min. leach period, the slurry was poured into a vacuum filter and the iron-bearing water was separated from the limestone by filtration. The limestone filter cake was then dried and the brightness was measured on a Hunter reflectometer using the L (lightness) reading. The Hunter reflectometer is described in the Assignee's prior U.S. Pat. No. 4,661,164.

The second sample of ground limestone was slurried with water until it included 50% solids by weight. To the slurry was added 20 pounds per ton of the chelating agent, tetrasodium salt of EDTA (ethylenediamene-tetraacetic acid), and 7 pounds per ton of sodium hydrosulfite. The limestone slurry and chemicals were mixed gently for 25 min. at a temperature of 150 deg. F. The slurry was then poured into a vacuum filter and the iron-bearing water separated from the limestone. The limestone filter cake was then dried and its brightness was measured on the Hunter reflectometer using the L reading.

Table I shows the results of the two tests including the brightness of the wet ground limestone before leaching.

TABLE I

| Sample | Acetic Acid | Sodium Hydro-sulfite | EDTA | pH | Temp. deg. F. | Hunter L |
|---|---|---|---|---|---|---|
| not leached | | | | | | 94.0 |
| Fenske process | 3#/ton | 7#/ton | | 7.2 | 150 | 94.1 |
| New process | | 7#/ton | 20#/ton | 9.4 | 150 | 95.1 |

EXAMPLE II

A limestone product with an average particle size of 4 microns is commonly used by consumers of the white limestone products. Those consumers require a product that has a Hunter L value greater than 96.0. Two series of tests were conducted on a wet ground limestone product that was ground to a size of 85% smaller than 44 micron and then leached. The first test series used the patented Fenske process. The second test series used the new leaching process. After leaching, the iron-bearing water was filtered away from the limestone. The limestone filter cakes were then re-slurried with fresh water and ground to the final product size of 4 microns.

Table II show the results of the test series and the brightness of a non-leached limestone sample ground to 4 microns in size.

TABLE II

| Sample | Acetic Acid | Sodium Hydro-sulfite | EDTA | pH | Temp. deg. F. | Hunter L |
|---|---|---|---|---|---|---|
| not leached | | | | | | 95.9 |
| Fenske process | 3#/ton | 7#/ton | | 7.2 | 150 | 96.0 |
| New process | | 7#/ton | 20#/ton | 9.4 | 150 | 97.1 |

EXAMPLE III

In this example, the effect of varying amounts of a chelating agent, specifically the tetrasodium salt of EDTA, was examined. All other conditions remained constant. The leaching method was carried out in accordance with this invention, substantially as described in Example I.

TABLE III

| Sample | Sodium Hydrosulfite | EDTA | pH | Temp. deg. F. | Hunter L |
|---|---|---|---|---|---|
| not leached | | | | | 94.5 |
| 1 | 7#/ton | 1#/ton | 9.4 | 150 | 94.2 |
| 2 | 7#/ton | 5#/ton | 9.4 | 150 | 95.2 |
| 3 | 7#/ton | 10#/ton | 9.4 | 150 | 95.3 |
| 4 | 7#/ton | 20#/ton | 9.4 | 150 | 95.2 |
| 5 | 7#/ton | 30#/ton | 9.4 | 150 | 95.2 |
| 6 | 7#/ton | 40#/ton | 9.4 | 150 | 95.2 |

EXAMPLE IV

A series of tests were carried out similar to those described in Example III, except the amounts of the bleaching agent, specifically sodium hydrosulfite, were varied, while all other conditions remained constant. The results of these tests are shown below in Table IV.

TABLE IV

| Sample | Sodium Hydrosulfite | EDTA | pH | Temp. deg. F. | Hunter L |
|---|---|---|---|---|---|
| not leached | | | | | 94.5 |
| 1 | 2#/ton | 20#/ton | 9.4 | 150 | 94.9 |
| 2 | 4#/ton | 20#/ton | 9.4 | 150 | 95.1 |
| 3 | 6#/ton | 20#/ton | 9.4 | 150 | 95.0 |
| 4 | 8#/ton | 20#/ton | 9.4 | 150 | 95.1 |
| 5 | 10#/ton | 20#/ton | 9.4 | 150 | 95.2 |
| 6 | 15#/ton | 20#/ton | 9.4 | 150 | 95.5 |
| 7 | 20#/ton | 20#/ton | 9.4 | 150 | 95.2 |

EXAMPLE V

A series of test were conducted in the same manner as Examples III and IV, except that the temperatures under which the leaching processes were conducted were varied, while all other conditions remained constant. The results of these tests are shown in Table V.

TABLE V

| Sample | Sodium Hydrosulfite | EDTA | pH | Temp. deg. F. | Hunter L |
|---|---|---|---|---|---|
| not leached | | | | | 94.5 |
| 1 | 7#/ton | 20#/ton | 9.4 | 71 | 94.8 |
| 2 | 7#/ton | 20#/ton | 9.4 | 90 | 94.7 |
| 3 | 7#/ton | 20#/ton | 9.4 | 110 | 95.0 |
| 4 | 7#/ton | 20#/ton | 9.4 | 130 | 95.0 |
| 5 | 7#/ton | 20#/ton | 9.4 | 150 | 95.0 |
| 6 | 7#/ton | 20#/ton | 9.4 | 170 | 95.2 |
| 7 | 7#/ton | 20#/ton | 9.4 | 190 | 95.2 |

EXAMPLE VI

Tests similar to those disclosed in the tables above were carried out in which the time period of the leaching process, in accordance with this invention, was varied, while all other conditions remained constant. The results of these tests are shown in the following Table VI.

TABLE VI

| Sample | Sodium Hydro-sulfite | EDTA | pH | Temp. deg. F. | Time | Hunter L |
|---|---|---|---|---|---|---|
| not leached | | | | | | 93.8 |
| 1 | 7#/ton | 20#/ton | 9.4 | 150 | 10 min. | 94.4 |
| 2 | 7#/ton | 20#/ton | 9.4 | 150 | 20 min. | 94.5 |
| 3 | 7#/ton | 20#/ton | 9.4 | 150 | 30 min. | 94.6 |
| 4 | 7#/ton | 20#/ton | 9.4 | 150 | 40 min. | 94.3 |
| 5 | 7#/ton | 20#/ton | 9.4 | 150 | 120 min. | 94.4 |
| 6 | 7#/ton | 20#/ton | 9.4 | 150 | 240 min. | 94.3 |
| 7 | 7#/ton | 20#/ton | 9.4 | 150 | 360 min. | 94.0 |
| 8 | 7#/ton | 20#/ton | 9.4 | 150 | 420 min. | 93.9 |

EXAMPLE VII

A limestone sample was wet ground to a size of 85% smaller than 10 microns. The ground limestone was divided into two samples for a series of tests comparing two different chelating agents. In the first test, the tetrasodium salt of EDTA (Sample I) was utilized as the chelating agent, while in the second test, the trisodium salt of N-hydroxyethyl ethylenediaminetriacetic acid (Sample II) EDTA was utilized. The purpose of the tests was to show that any chelating agent that would complex divalent ions would produce a high degree of whiteness in the finished dried limestone product. The results of these tests are shown in Table VII.

TABLE VII

| Sample | Sodium Hydrosulfite | pH | Temp. deg. F. | Hunter L |
|---|---|---|---|---|
| not leached | | | | 95.6 |
| Sample I | 7#/ton | 9.4 | 150 | 96.5 |
| Sample II | 7#/ton | 9.4 | 150 | 96.4 |

In all of the above examples, it is readily seen that a higher degree of whiteness, as indicated by the Hunter L reflectometer readings, is obtained by utilizing the bleaching method according to this invention, as opposed to the same finely ground and slurried limestone without the addition of the chelating and bleaching agents utilized in this invention.

Furthermore, Tables I and II clearly show that the method of bleaching limestone in accordance with this invention produces a substantially improved whiteness in the final product than does the Fenske process disclosed in the prior U.S. Pat. No. 4,239,736.

In Example III, it appears that once a minimum amount of the chelating agent is utilized to produce a marked improvement in the whiteness of the final limestone product, the addition of greater amounts of the chelating agent do not substantially improve the whiteness of the product. Thus, a minimum amount of chelating agent in Example III, such as 5 pounds per ton of limestone, may be utilized just as effectively as 40 pounds of chelating agent per ton of limestone.

It also appears from Table IV, that after a minimum amount of bleaching agent, such as sodium hydrosulfite, is utilized in the bleaching process, such as 2 to 4 pounds of bleaching agent per ton of limestone, that additional amounts of bleaching agent has little effect on the whiteness of the final product, until the amount of sodium hydrosulfite reaches the amount of 15 pounds per ton of limestone. The sample no. 6 reading in Table IV may be an aberration since all of the other readings for samples 1-7 produce whiteness readings very similar.

Table V indicates that higher temperatures above 110 deg. F. are the most effective temperatures in producing a final product of maximum whiteness.

Table VI indicates that a successful whitening process may be carried out in a minimum period of time, such as in the order of 20-30 min., and that a continuation of the bleaching process, with all other conditions being equal, reduces the whiteness of the final product.

The results of Example VII show that various chelating agents may be utilized with equal success.

Other bleaching agents than sodium hydrosulfite may be used with equal success, and particularly zinc sulfite, K-Brite-3E and K-Brite - 3K of the Virginia Chemical Company. Moreover, it is believed that the bleaching agent such as sulfur dioxide and zinc dust can also be used with comparable results and improved whiteness of the final limestone product.

Based upon the results of Example VII and the known properties of other chelating agents, it is believed that all salts of EDTA, known to be chelating agents, such as the calcium disodium salt of EDTA, could be used in the bleaching process and result in acceptable and comparable values of whiteness for the completed limestone product, provided all the other conditions remain constant.

It is therefore evident that an improved method of bleaching limestone has been produced which is capable of obtaining higher values of whiteness in finished limestone products by the utilization of a ground limestone slurry in which a chelating agent and a bleaching agent are mixed for separating the iron contaminants from the limestone, without the necessity of using acids to reduce the pH from the natural pH of the limestone.

What is claimed is:

1. A method for improving the brightness of limestone containing at least a small amount of iron, comprising the steps of:
   (a) grinding said limestone,
   (b) forming a slurry of said ground limestone with water,
   (c) adding a chelating agent capable of complexing divalent iron ions to said slurry in at least an amount sufficient to complex ions in said slurry,
   (d) adding a bleaching agent selected from the group consisting of hydrosulfites, zinc sulfite, sulfur dioxide, or zinc dust to said slurry, in at least an amount sufficient to react with iron present in said slurry, and
   (e) separating said limestone from the liquid in the slurry containing said iron.

2. The method according to claim 1, in which said chelating agent consists of a salt of ethylenediaminetetraacetic acid.

3. The method according to claim 2 in which said chelating agent is a sodium salt of ethylenediaminetetraacetic acid.

4. The method according to claim 1 in which said chelating agent is an agent of the group consisting of the tetrasodium salt of ethylenediaminetetracetic acid and the trisodium salt of N-hydroxyethyl ethylenediaminetriacetic acid.

5. The method according to claim 1 in which said chelating agent is present in said slurry in an amount at least approximately 5 lbs. per ton of limestone.

6. The method according to claim 5 in which said chelating agent is present in the amount of approximately 20 lbs. per ton of limestone.

7. The method according to claim 6 in which said bleaching agent is present in said slurry in the amount of approximately 7 lbs. per ton of limestone.

8. The method according to claim 7 in which said chelating agent is the tetrasodium salt of ethylenediamenitetraacetic acid.

9. The method according to claim 1 in which said slurry has a solids content of approximately 15–50% ground limestone.

10. The method according to claim 1 in which said bleaching agent is present in said slurry in an amount at least approximately 2 lbs. per ton of limestone.

11. The method according to claim 1 in which said bleaching agent is a hydrosulfite.

12. The method of claim 11 in which the hydrosulfite is sodium hydrosulfite.

13. The method according to claim 1 in which said slurry is maintained at a temperature of at least approximately 71 deg. F.

14. The method according to claim 1 in which said grinding step comprises grinding said limestone to a size approximately 85% smaller than 44 microns.

15. The method according to claim 14 further comprising the step of forming another slurry of said separated limestone with water and grinding the resulting slurried limestone to a size of 4 microns.

16. The method according to claim 1 further comprising the step of mixing said chelating agent and said bleaching agent in said slurry, said step of separating said limestone from the liquid in the slurry commencing approximately 10 min. - 4 hours after said mixing step.

17. The method according to claim 1 in which the pH of said slurry is 9.0–9.6.

18. The method according to claim 17 in which said pH is approximately 9.4.

19. The method according to claim 1 in which said separating step comprises filtering.

* * * * *